US010815417B2

(12) United States Patent
Eluru et al.

(10) Patent No.: US 10,815,417 B2
(45) Date of Patent: Oct. 27, 2020

(54) INVERT EMULSION CONTAINING VEGETABLE OIL

(71) Applicant: HALLIBURTON ENERGY SERVICES, INC., Houston, TX (US)

(72) Inventors: Sairam Eluru, Pune (IN); Chetan Prakash, Pune (IN); Umesh Namdeo Nehete, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 47 days.

(21) Appl. No.: 16/317,372

(22) PCT Filed: Sep. 6, 2016

(86) PCT No.: PCT/US2016/050420
§ 371 (c)(1),
(2) Date: Jan. 11, 2019

(87) PCT Pub. No.: WO2018/048385
PCT Pub. Date: Mar. 15, 2018

(65) Prior Publication Data
US 2020/0181482 A1    Jun. 11, 2020

(51) Int. Cl.
*E21B 43/267* (2006.01)
*C09K 8/80* (2006.01)
*C09K 8/64* (2006.01)
*C09K 8/36* (2006.01)

(52) U.S. Cl.
CPC .................. *C09K 8/64* (2013.01); *C09K 8/36* (2013.01); *C09K 8/805* (2013.01); *E21B 43/267* (2013.01)

(58) Field of Classification Search
CPC .. C09K 8/36; C09K 8/035; C09K 8/32; E21B 21/003; E21B 43/26; E21B 43/267
See application file for complete search history.

(56) References Cited

U.S. PATENT DOCUMENTS

| 5,633,220 A | 5/1997 | Cawiezel et al. |
| 5,977,031 A | 11/1999 | Patel |
| 9,038,717 B2 | 5/2015 | Vo et al. |

(Continued)

FOREIGN PATENT DOCUMENTS

| CA | 2854748 A1 | 12/2015 |
| WO | 9506694 A1 | 3/1995 |

(Continued)

OTHER PUBLICATIONS

International Search Report and Written Opinion; PCT Application No. PCT/US2016/050420; dated May 26, 2017.

(Continued)

*Primary Examiner* — Zakiya W Bates
(74) *Attorney, Agent, or Firm* — Polsinelli PC

(57) ABSTRACT

An invert emulsion composition which includes a base fluid having an oleaginous phase and a non-oleaginous phase, an emulsifier, and wherein the oleaginous phase includes a mixture of vegetable oil and an oil other than vegetable oil. The composition may also include particles such as proppants or gravel, which may be coated prior to introduction to the composition to assist in stabilization the emulsion. The invert emulsion composition can be employed in fracturing, gravel packing, and diversion operations, and the like.

22 Claims, 6 Drawing Sheets

(56) References Cited

U.S. PATENT DOCUMENTS

| | | |
|---|---|---|
| 2003/0036484 A1 | 2/2003 | Kirsner et al. |
| 2005/0244641 A1 | 11/2005 | Vincent |
| 2005/0250652 A1 | 11/2005 | Taylor et al. |
| 2015/0126415 A1 | 5/2015 | Husein et al. |
| 2018/0044573 A1* | 2/2018 | Perry ............ C09K 8/602 |

FOREIGN PATENT DOCUMENTS

| | | |
|---|---|---|
| WO | 2009127589 A1 | 10/2009 |
| WO | 2014124094 A1 | 8/2014 |

OTHER PUBLICATIONS

Office Action; Canadian Application No. 3,027,510; dated Dec. 17, 2019.

* cited by examiner

INVERT EMULSION CONTAINING VEGETABLE OIL

CROSS-REFERENCE TO RELATED APPLICATIONS

This application is a national stage entry of PCT/US2016/050420 filed Sep. 6, 2016, said application is expressly incorporated herein in its entirety.

FIELD

The present disclosure relates to fluids for subterranean wellbores. In particular, the present disclosure relates to an invert emulsion composition for suspending particles, its preparation and use.

BACKGROUND

During the life of a wellbore, it is often necessary to deliver components to various subterranean zones within the wellbore. Often the components are delivered via a carrier fluid. The components may be suspended in the carrier fluid and pumped downhole to the desired zone. One of the major processes includes fracturing treatments for wellbore stimulation. In a typical hydraulic fracturing treatment, a carrier fluid often referred to as a "fracturing fluid" is pumped through a wellbore and into a subterranean formation producing zone at a rate and pressure such that one or more fractures are formed or extended into the zone. The fracturing fluid can include proppants which are introduced into the fractures and prevent the fractures from closing.

A carrier fluid can also be employed in gravel packing operations. Gravel packing is employed as a sand control method, and in particular to prevent the flow of formation sand during hydrocarbon production. Such operations involve installing one or more sand screens in the flow path between production tubing and the rock face in the producing reservoir. The annulus around the screen is packed with gravel to prevent the passage of sand around the screen. Sand is filtered and held back by the gravel and/or screen, but formation fluids continue to flow unhindered (by either the gravel or screen) into the production string.

Carrier fluids often include various agents to aid in the suspension of proppants or other particles. Further, carrier fluids may include both an oleaginous phase (e.g., including oil) and a non-oleaginous phase (e.g., including water). Fluids where the oleaginous phase is the continuous phase and the non-oleaginous phase is the discontinuous or external phase are often referred to as invert emulsions. The use of invert emulsions may depend on the particular well conditions and fluids.

BRIEF DESCRIPTION OF THE DRAWINGS

Implementations of the present technology will now be described, by way of example only, with reference to the attached figures, wherein.

Figure 1:
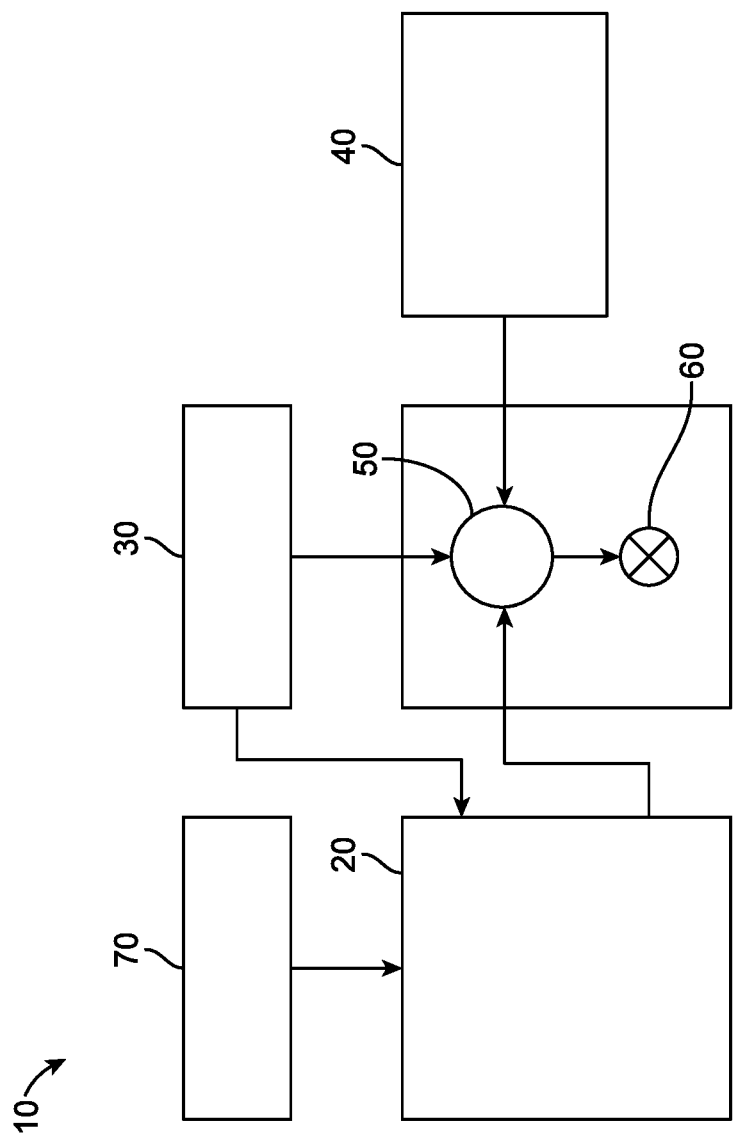
FIG. 1 is a diagram illustrating an example of a fracturing system that may be used in association with certain aspects of the present disclosure.

It should be understood that the various aspects are not limited to the arrangements and instrumentality shown in the drawings.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

In the following discussion and in the claims, the terms "including" and "comprising" are used in an open-ended fashion, and thus should be interpreted to mean "including, but not limited to . . . ". As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

The present disclosure is directed to a carrier fluid for suspending particles such as proppants or gravel. The carrier fluid may be an inverted emulsion composition made up of a base fluid having an oleaginous fluid and a non-oleaginous fluid. The oleaginous fluid may be the continuous phase and the non-oleaginous phase the discontinuous phase (or external phase). The oleaginous fluid includes a mixture of a vegetable oil and an oil other than a vegetable oil, such as a mineral oil. As disclosed herein, it has been found that the inclusion of vegetable oils provides unexpectedly advantageous results, such as improved viscosity and stability. The improved viscosity provides better suspension properties for particles such as proppants and gravel downhole.

Additionally, while the composition may include both the oleaginous fluid and non-oleaginous fluid, the oleaginous fluid may make up the predominant portion of the composition, as high as 90% or may be present in as little as 5% of the composition by volume. The invert emulsion composition may also include an emulsifier. The emulsifier may be any type of emulsifying or suspension agent, however, a particular example is a combination of a dimer diamine and polyurea. Polymeric gelling agents may also be added to assist in providing suspension properties. Moreover, breakers may be added to the composition, which act to break the composition once downhole thereby releasing any suspended particulate.

The composition may include various particles, including sand, gravel and the like, depending on the operation to be performed. For example, a fracturing operation may include proppants.

In order to assist in providing a stabilized emulsion, the particles may be coated with a portion of the oleaginous fluid prior to introduction into the composition. For example, when the oleaginous fluid is present at less than 30% of the composition or at a range of less than 3:7 oleaginous fluid to non-oleaginous fluid the particles may be coated prior to introduction.

The composition herein can be employed in various operations including fracturing operations, gravel packing operations, diversion operations, as well as other operations.

The following provides a more detailed discussion of the components herein.

Base Fluid

The invert emulsion composition disclosed herein includes an oleaginous fluid. The oleaginous fluid forms the continuous phase of the invert emulsion and includes a mixture of a vegetable oil and an oil other than a vegetable oil. The vegetable oil may be any oil extracted from biological matter. For instance, the vegetable oil may be extracted from plant matter, such as seeds, fruit, or nuts. The vegetable oil may include glycerides, including triglycerides. Vegetable oil may also be synthetically produced, for example, by preparing oils with similar chemical composition, for example preparing oils including glycerides. Any oil containing glycerides may be employed.

Exemplary vegetable oils include, but are not limited to custard seed oil, almond oil, babassu oil, castor oil, clark A oil, avocado oil, apricot oil, coffee bean oil, coconut oil, corn oil, cotton seed oil, jojoba oil, linseed oil, mustard seed oil, olive oil, palm oil, peanut oil, safflower oil, sesame oil, soybean oil, sunflower seed oil, wheat germ oil and mixtures thereof. A particular vegetable oil includes custard seed oil, which is oil extracted from the seeds of custard apple (also can be referred to cherimoya fruit).

The oleaginous fluid contains oil other than vegetable oil as well. Such additional oils include mineral oil, petroleum oils, natural oils, synthetically-derived oils, diesel oil, fuel oil, kerosene oil, crude oil, light crude oil, mineral oil, synthetic oil, olefins, polyolefins, alpha-olefins, internal olefins, linear or branched paraffins, n-paraffins, iso-paraffins, n-alkanes, cyclic alkanes, branched alkanes, polydiorganosiloxanes, acetals, esters, diesters of carbonic acid or mixtures thereof. The oleaginous fluid includes a vegetable oil and a non-vegetable oil, such as mineral oil, in a ratio of vegetable oil to non-vegetable oil from about 5:95 to 95:5, alternatively from about 1:99 to 99:1, alternatively from about 3:7 to 99:1, alternatively from about 2:5 to 9:1, alternatively from about 3:5 to 4:5, alternatively about 1:1, encompassing any value and subset therebetween. Accordingly, the vegetable oil may make up at least about 5% of the oleaginous composition, alternatively at least about 10%, alternatively at least about 15%, alternatively at least about 20%, alternatively at least about 25%, alternatively at least about 30%, alternatively at least about 35%, alternatively at least about 40%, alternatively at least about 45%, alternatively at least about 50% of the oleaginous fluid. The vegetable oil may be present from about 5 to 95% of the oleaginous fluid, alternatively about 10 to 90%, alternatively about 15 to 85%, alternatively about 20 to 80%, alternatively about 25 to 75%, alternatively about 30 to 70%, alternatively about 35 to 65%, alternatively about 40 to 60%, alternatively about 45 to 55%, alternatively about 50% of the composition, encompassing any value and subset therebetween.

The base fluid may also include a non-oleaginous fluid. The non-oleaginous fluid may also be partially immiscible in the oleaginous fluid. Exemplary non-oleaginous fluid includes water, saltwater, seawater, brine, freshwater, and the like. A particular fluid includes filtered brine or "clear brine." Brines may include water soluble salts. Brines that may be used include monovalent or bivalent salts, and may include salts having for example alkali metals or alkaline earth metals. Particular salts which may be suitable include $CaCl_2$, $CaBr_2$, NaBr, $ZnBr_2$, NaCl, KCl, ZnBr, $NH_4Cl$, cesium formate, potassium formate, sodium formate, and mixtures thereof. The salts can be added from about 0 to 25 pounds per gallon (ppg), or alternatively from 5 to 25 ppg.

The oleaginous fluid may be present at a ratio of oleaginous fluid to non-oleaginous fluid (for example, oil to water ratio) that ranges from about 1:19 to about 19:1. Alternatively, the oleaginous fluid may be present at a ratio of oleaginous fluid to non-oleaginous fluid that ranges from about 1:9 to 9:1, alternatively from about 3:7 to 7:3, alternatively from about 1:4 to 4:1, alternatively from about 1:2 to 2:1, encompassing any value and subset therebetween.

The oleaginous fluid may be present at a range of from about 5% to 95% of the inverted emulsion composition. Alternatively the oleaginous fluid may be present at 30% or less of the inverted emulsion composition by volume, alternatively less than 30% of the composition, alternatively 25% or less, alternatively 20% or less, alternatively 15% or less, alternatively 10% or less, alternatively 5% or less of the composition by volume. The oleaginous fluid may be present in the inverted emulsion composition in the range of from a lower limit of about 5%, 10%, 15%, 20%, 25%, 30%, 35%, 40%, 45%, and 50%, to an upper limit of about 95%, 90%, 85%, 80%, 75%, 70%, 65%, 60%, 55%, 50% by volume, encompassing any value and subset therebetween.

Emulsifier

Emulsifiers may be employed to assist in a obtaining a more stable emulsion. Emulsifiers include polyaminated fatty acids, polyolefin amides and alkeneamides, quaternary ammonium compounds. Suitable emulsifiers also include combination or blend of a carboxylic acid-terminated polyamide and a mixture produced by the Diels-Alder reaction of dienophiles such as carboxylic acids, polycarboxylic acids, and anhydrides, or combinations or mixes thereof, with a mixture of fatty acids and resin acids as described in U.S. Pat. No. 6,620,770. A commercially available emulsifier includes EZ MUL® NT emulsifier from Halliburton Energy Services, Inc. Emulsifiers such as FACTANT™ highly concentrated tall oil derivative may be included and is available from Halliburton Energy Services, Inc.

Emulsifiers can be present in the composition in a range from about 0.1% to 20% alternatively from about 0.1% to 5%, and alternatively about 0.5% to 2%, in weight/volume (e.g., g/100 ml). Emulsifiers may be present in an amount in the range of from a lower limit of about 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10%, to an upper limit of about 20.0%, 19.5%, 19.0%, 18.5%, 18.0%, 17.5%, 17.0%, 16.5%, 16.0%, 15.5%, 15.0%, 14.5%, 14.0%, 13.5%, 13.0%, 12.5%, 12.0%, 11.5%, 11.0%, 10.5%, and 10.0% in weight/volume (e.g., g/100 ml), encompassing any value and subset therebetween.

Suspension Aid

The invert emulsifier composition may include a suspension agent. A suspension agent may include any agent that aids in the suspension of particles in the composition. Exemplary suspension agents include for example a combination of a dimer of a diamine (or fatty acid dimer diamine) and a polyurea.

A commercially available suitable polyurea compound may be ADDITIN™ M10.411 additive, available from Rhein Chemie. Commercially available hydrophobic dimer amines suitable for use include without limitation VERSAMINE® 552 hydrogenated fatty C36 dimer diamine, and VERSAMINE® 551 fatty C36 dimer diamine, both available from Cognis Corporation (functional products) of Monheim, Germany and Cincinnati, Ohio, and PRIAMINE™ 1074, available from Croda Chemicals. These fatty dimer diamines may be prepared commercially from fatty dimer diacids which have been produced from dimerisation of vegetable oleic acid or tall oil fatty acid by thermal or acid catalyzed methods.

An exemplary dimer amine is a C36 fatty dimer diamine having the following molecular structure:

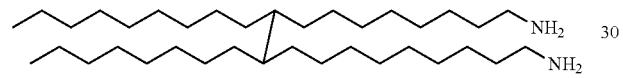

Suitable exemplary dimer amines having from C18-C72 branched or unbranched dimer amines are suitable.

In one example, a commercially available C36 dimer diamine contains C18 fatty monoamine and C54 fatty trimer triamine which are obtained during the commercial production of the dimer diamine. The dimerisation of C18 tall oil fatty acids produces the material leading to the C36 dimer acids. This material is a mixture of monocyclic dicarboxylic acid, acyclic dicarboxylic acid and bicyclic dicarboxylic acid along with small quantities of trimeric triacids. These diacids are converted into diamines via the reaction scheme given below:

Reaction Scheme I.

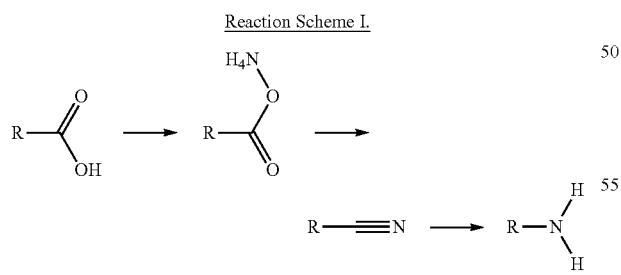

These diamines are further converted into compounds that fall under the scope of hydrophobic amine additives. These diamines are converted into cyanoethyl derivatives via cyanoethylation with acrylonitrile; these cyanoethyl derivatives are further reduced into aminopropyl amines via reduction as shown in the reaction scheme II below, as taught in U.S. Pat. No. 4,250,045, issued Feb. 10, 1981 to Coupland, et al.

Reaction Scheme II

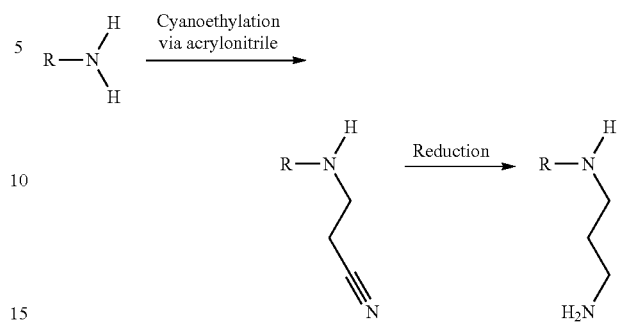

Dicyanoethylated dimer diamine is available commercially as Kemamine DC 3680 and 3695 and di N-aminopropylated dimer diamine is available commercially as Kemamine DD 3680 and 3695 from Chemtura Corporation USA. Different structures of the dimeric hydrophobic amine additives are given below:

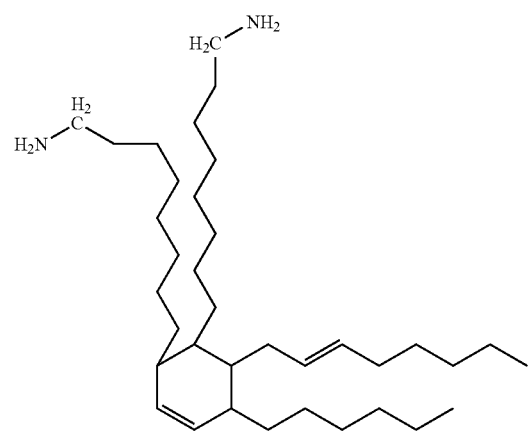

Monocyclic dimer diamine

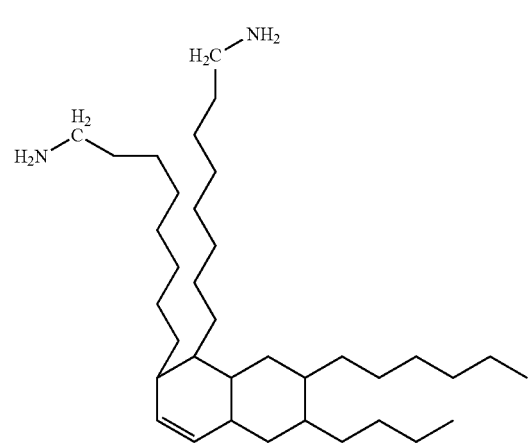

Bicyclic dimer diamine

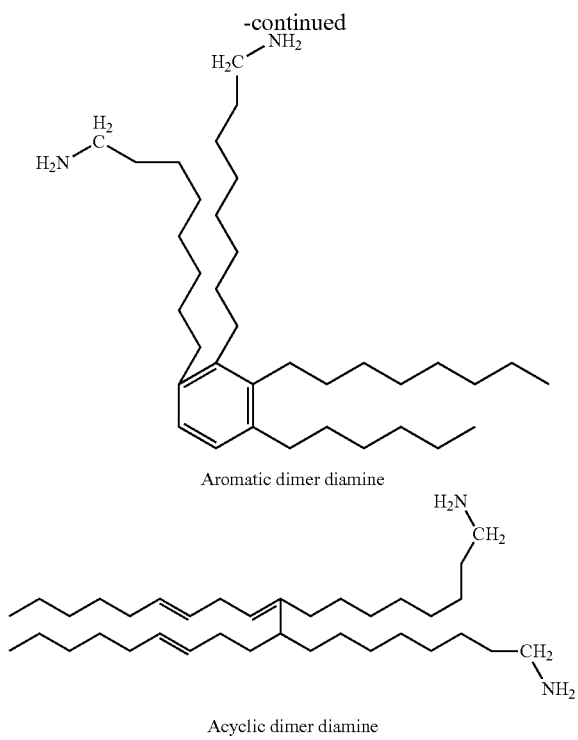

Aromatic dimer diamine

Acyclic dimer diamine

These diamines are further converted into compounds that fall under the scope of hydrophobic amine additives. These diamines are converted into cyanoethyl derivatives via cyanoethylation with acrylonitrile; these cyanoethyl derivatives are further reduced into aminopropyl amines via reduction as shown in the reaction scheme II below, as taught in U.S. Pat. No. 4,250,045, issued Feb. 10, 1981 to Coupland, et al.

An additional suspension aid includes micro-fibrous cellulose (may also be referred to as a surfactant). Microfibrous cellulose may be prepared by microbial fermentation or MFC prepared by mechanically disrupting/altering cereal, wood, or cotton-based cellulose fibers.

Suspension agent can be added in an amount of from above 0 to about 100 ppg, or alternatively from about 30 ppg to about 50 ppg encompassing any value and subset therebetween.

Particles

Illustrative particles that may be used in conjunction with the instant disclosure include proppants, microproppants, ultra light weight proppants, gravel, or any fine or coarse solid particles, including for example, sand, bauxite, ceramic, gravel, glass, polymer materials, polytetrafluoroethylene materials, nut shell pieces, cured resinous particulates having nut shell pieces, seed shell pieces, cured resinous particulates having seed shell pieces, fruit pit pieces, cured resinous particulates having fruit pit pieces, wood, composite particulates, and any combination thereof. Suitable composite particulates may have a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof.

The proppant particulates may be substantially spherical materials, fibrous materials, polygonal materials (such as cubic materials), irregular shapes, and any combination thereof.

The proppant particles utilized in accordance with the present disclosure are generally of a size such that formation particulate solids which migrate with produced fluids are prevented from being produced from the subterranean zone. Generally, the proppant particles have a size in the range of from about 2 to about 400 mesh, U.S. Sieve Series. In some cases, the proppant is graded sand having a particle size in the range of from about 10 to about 70 mesh, U.S. Sieve Series. Sand particle size distribution ranges may be one or more of 10-20 mesh, 20-40 mesh, 40-60 mesh or 50-70 mesh, depending on the particular size and distribution of formation solids to be screened out by the consolidated proppant particles. Microproppants or microspheres may have a D50 particle size smaller than 100 mesh (149 µm), and in certain instances equal to or smaller than 200 mesh (74 µm), 230 mesh (63 µm) or even 325 mesh (44 µm). Microproppants or microspheres may have a D50 particle size ranging from 325 mesh (5 µm) to 100 mesh (149 µm). Exemplary commercially available microproppants include 3M™ Glass Bubbles.

Proppants can be included in the composition in a range of from about 0.06% to about 120%, or alternatively from about 1 to about 15% weight/volume (e.g., g/100 ml). Proppants may be present in an amount in the range of from a lower limit of about 0.06%, 1%, 10%, 20%, 25%, 30%, 40%, 50%, to an upper limit of about 120.0%, 100.0%, 80.0%, 75.0%, 70.0%, 60.0%, %, 50%, 40%, 30%, 20%, 15.0 and 7.0% in weight/volume (e.g., g/100 ml), encompassing any value and subset therebetween.

Dust particles may be included which are made up of the same type of materials as the aforementioned proppants described herein but may be present at particle size less than 1000 nm. The inclusion of such dust may assist in the formation of a pickering emulsion. The composition can include proppant particles and intermediate particles, where the intermediate particles are particles whose size is between the silica dust and proppant particles.

The silica dust can be from about 0.1 wt. % to about 2 wt. %, from about 0.2 wt. % to about 1.5 wt. %, or from about 0.5 wt. % to about 1 wt. % based on the total silica, encompassing any value and subset therebetween.

Breakers

Breakers can be incorporated into the suspension composition. They can be added to the suspension composition prior to, during, or after introduction into the wellbore. Breakers are used to "break" a gelled form of the suspension composition. This can be done by breaking apart any polymeric components, removing or reducing the extent of cross-linking, or otherwise reducing the viscosity or thickness of the gel.

Many known breakers may be suitably employed, including, for example, oxidative breakers, acid breakers, delayed release acid breakers, delayed release enzyme breakers, temperature activated breakers, hydrolysable ester breakers, demulsifiers, slow releasable demulsifiers, and any combination thereof.

One type of breaker employed with the composition employed herein is an oxidative breaker. Oxidative breakers can include a bromate, a chlorite, a peroxide, a perchlorate, a perbromate, a perborate, a percarbonate, a perphosphate, or a persulfate, an oxyacid, an oxyanion of a halogen or a combination thereof. The breaker can include any compound which releases the aforementioned breakers as ions.

Delayed acid release breakers can be suitably employed. For example, breakers which contain precursors which form acids within the well. Breakers may contain esters such as aliphatic or aromatic esters, and may include formate esters or lactate esters. Such breakers may contain a formate ester which hydrolyzes to form formic acid as a result of hydrolysis. An exemplary delayed release acid breaker includes N-FLOW™ 325 breaker (may be referred to as a filter cake breaker). Filter cake breaker systems can also be suitably employed. Breaking may occur in controlled manner employing encapsulates.

Demulsifiers may include additives which are the opposite charge of an emulsification or suspension agent, and so may be anionic or cationic. Amphoteric demulsifying agents may be used. Other demulsification agents may include alkoxylated alcohols, alkoxylated esters and/or alkoxylated amides. The demulsifier can be encapsulated or pelletized for delayed release.

Breakers can be included in the composition in a range of from 0.1 lbs/1000 gal to 100 lbs/1000 gal, alternatively from 0.001% to 1% by weight/volume (e.g. g/100 ml).

Furthermore, in some cases breakers may not be needed. For example, given that the invert emulsion composition disclosed herein has an oleaginous continuous phase, the composition may break in the presence of hydrocarbons downhole. In such event where the composition contacts hydrocarbons downhole, the composition may break or de-emulsify and release any suspended particles. The composition may also be break upon dilution in the presence of various aforementioned base fluids such as (brines, produced water, formation water etc.).

The viscosity of the emulsion may be from above 20 to 300 cP at 511 s-1 shear rate. Once broken, the viscosity of a broken composition may be about 20 cP at 511 s-1 shear rate or less. The actual requisite viscosities depend on the system and environment of the wellbore.

Gelling Agent

The composition disclosed herein may include a component which acts a gelling agent for thickening and increasing the viscosity of the composition. For example, polymers can be suitably employed as gelling agents, including cross-linkable and/or water soluble polymers which can interconnect to thicken or form a semi-solid gel. The polymers can include natural polymers, synthetic polymers, biopolymers, or derivatives thereof. The polymers can include polysaccharides, starches, cellulose, cellulose ethers, chitosan, diutan, xanthan gum, welan gum, tragacanth gum, karaya gum, galactomannans, guar gum, polyvinyl polymers, polymethacrylamides, and derivatives of all the aforementioned, whether naturally or synthetically produced. The polymers may be self cross-linkable or are cross-linkable in the presence of a cross-linking agent.

Cellulose ethers or cellulose ether derivatives include methyl cellulose (MC), ethyl cellulose (EC), carboxymethyl cellulose (CMC), hydroxyethyl cellulose (HEC), carboxymethylhydroxyethyl cellulose (CMHEC), hydroxyethyl cellulose (HEC), ethyl hydroxyethyl cellulose (EHEC), methylcellulose (MC), hydroxpropylcellulose (HPC), methylhydroxyethyl cellulose (MHEC) and methylhydroxypropyl cellulose (MHPC).

The gelling agents can be added to the suspension composition herein in a range of from about 10 to 200 lbs/1,000 gal, alternatively at a concentration of from about 0.1% to 2.4% weight/volume (e.g., g/100 ml).

Illustrations

The exemplary methods and compositions disclosed herein may directly or indirectly affect one or more components or pieces of equipment associated with the preparation, delivery, recapture, recycling, reuse, and/or disposal of the disclosed compositions. The following is provided an exemplary fracturing fluid process, however, the invert emulsion composition disclosed herein can be employed in many processes, including gravel packing operations, diversion operations, drilling, or stimulation or production processes.

Figure 2:
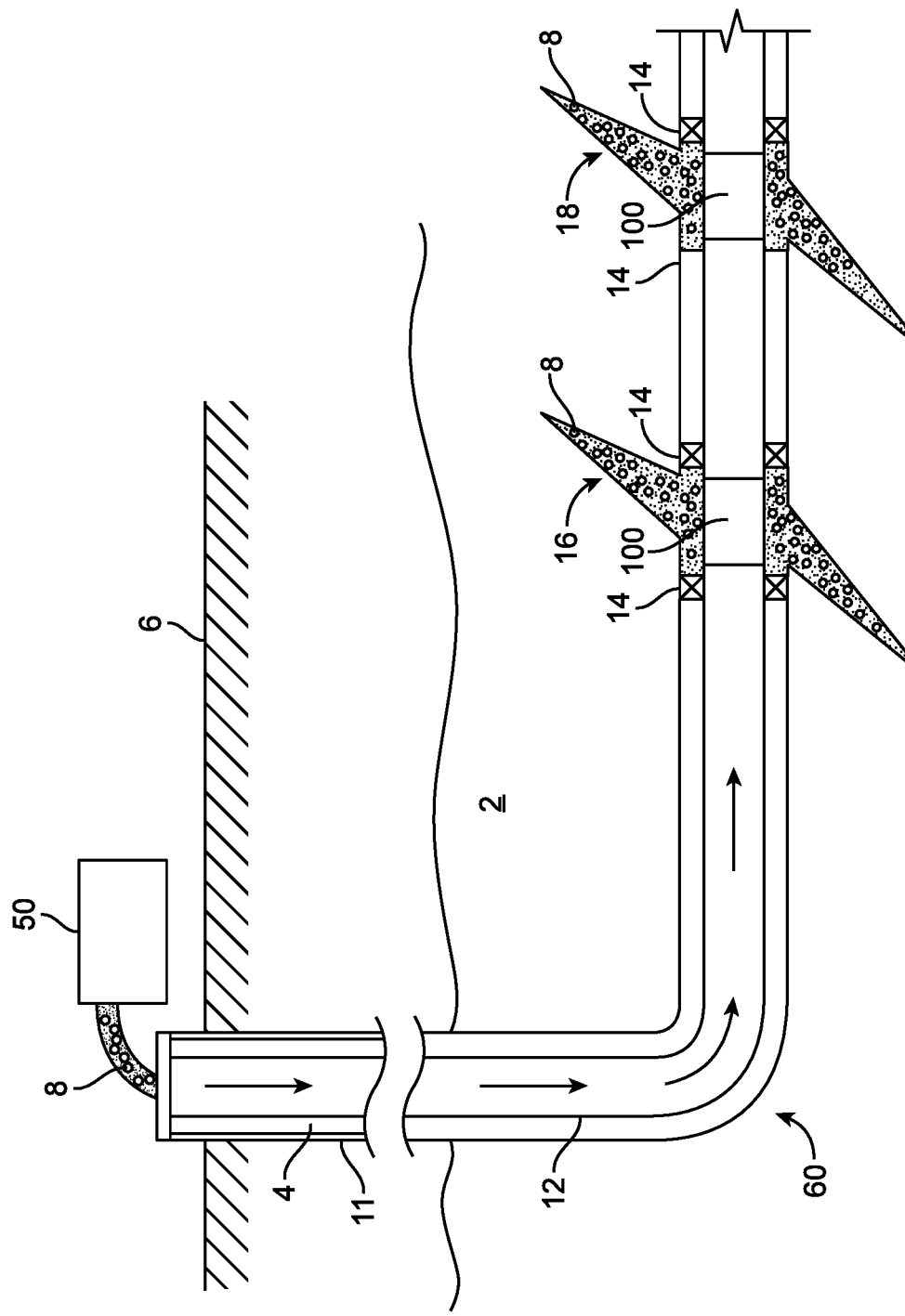
FIG. 2 is a diagram illustrating an example of a subterranean formation in which a fracturing operation may be performed in association with certain aspects of the present disclosure.

An exemplary fracturing system is illustrated in FIGS. 1 and 2. In this example, the system 10 includes a carrier composition, such as fracturing fluid producing apparatus 20, a fluid source 30, a proppant source 40, and a pump and blender system 50 and resides at the surface at a well site where a well 60 is located. The fluid source may include the base fluid as disclosed herein having a mixture of an oleaginous fluid and non-oleaginous fluid. In certain instances, the fracturing fluid producing apparatus 20 combines a gel pre-cursor or emulsifier with fluid (e.g., liquid or substantially liquid) from fluid source 30, to produce a hydrated fracturing fluid that is used in fracturing the formation, for example, by being pumped through a work string 12. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise a base fluid, water, a hydrocarbon fluid, a polymer gel, foam, air, nanoparticles, breakers, wet gases and/or other fluids.

The proppant source 40 can include the proppants as disclosed herein, as well as other proppants, and can be combined with the fracturing fluid. The proppant 40 may be coated with fluid from fluid source 30 prior to blending. The system may also include additive source 70 that provides one or more additives (e.g., emulsifiers, suspension agents, gelling agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 and out through a downhole tool 100, or through perforations or apertures of a casing or tubing, under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can distribute fracturing fluid and/or proppant to the target subterranean zone.

FIG. 2 illustrates a well 60 performing a fracturing operation in a portion of a subterranean formation of interest 2 surrounding a well bore 4. The well bore 4 extends from the surface 6, and the fracturing fluid 8 is applied to a portion of the subterranean formation 2 surrounding the horizontal portion of the well bore through, for example, a downhole tool 100. The tool 100 can include ports, holes, or a sleeve which permits exit of fluid from the work string 12. Alternative to the tool 100, the fracturing fluid 8 may be applied via perforations or other apertures in a casing 11 (when the casing extends that far), work string 12, other piping, or merely directly into the formation. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. In cased wells, perforations can be formed using shape charges, a perforating gun, hydro-jetting and/or other tools.

The well is shown with a work string 12 depending from the surface 6 into the well bore 4. The pump and blender system 50 is coupled to the work string 12 to pump the fracturing fluid 8 into the well bore 4. The work string 12 may include coiled tubing, jointed pipe, and/or other structures that allow fluid to flow into the well bore 4. The work string 12 can include flow control devices that control the flow of fluid from the interior of the work string 12 into the subterranean zone 2.

The work string 12 and/or the well bore 4 may include one or more sets of packers 14 that seal the annulus between the work string 12 and well bore 4 to define an interval of the well bore 4 into which the fracturing fluid 8 will be pumped. FIG. 2 shows two packers 14, one defining an uphole boundary of the interval and one defining the downhole end of the interval. When the fracturing fluid 8 is introduced into well bore 4 at a sufficient hydraulic pressure, one or more fractures 16, 18 may be created in the subterranean zone 2. The proppant particulates in the fracturing fluid 8 may enter the fractures 16, 18 where they may remain after the fracturing fluid flows out of the well bore. These proppant particulates may "prop" fractures 16, 18 such that fluids may flow more freely through the fractures 16, 18.

Diversion operations may also be employed with respect to multi-zone or cluster fracturing, wherein a particular zone is desired to be diverted from upcoming aqueous based fracturing fluid. The invert emulsion composition disclosed herein may be employed to divert such water based fluids. For example, the composition can be pumped to the last stage 18 of a cluster of fractures to divert the flow of upcoming aqueous based treatment/fracturing fluid or water within the formation. Given that the invert emulsion composition is "oil based" and has an oleaginous continuous phase, it can have hydrophobic properties and inhibit or prevent the flow of aqueous based fluid. Accordingly, water production from fracture 18 would cease while hydrocarbon production from facture 16 may be continued or begun.

Figure 3:
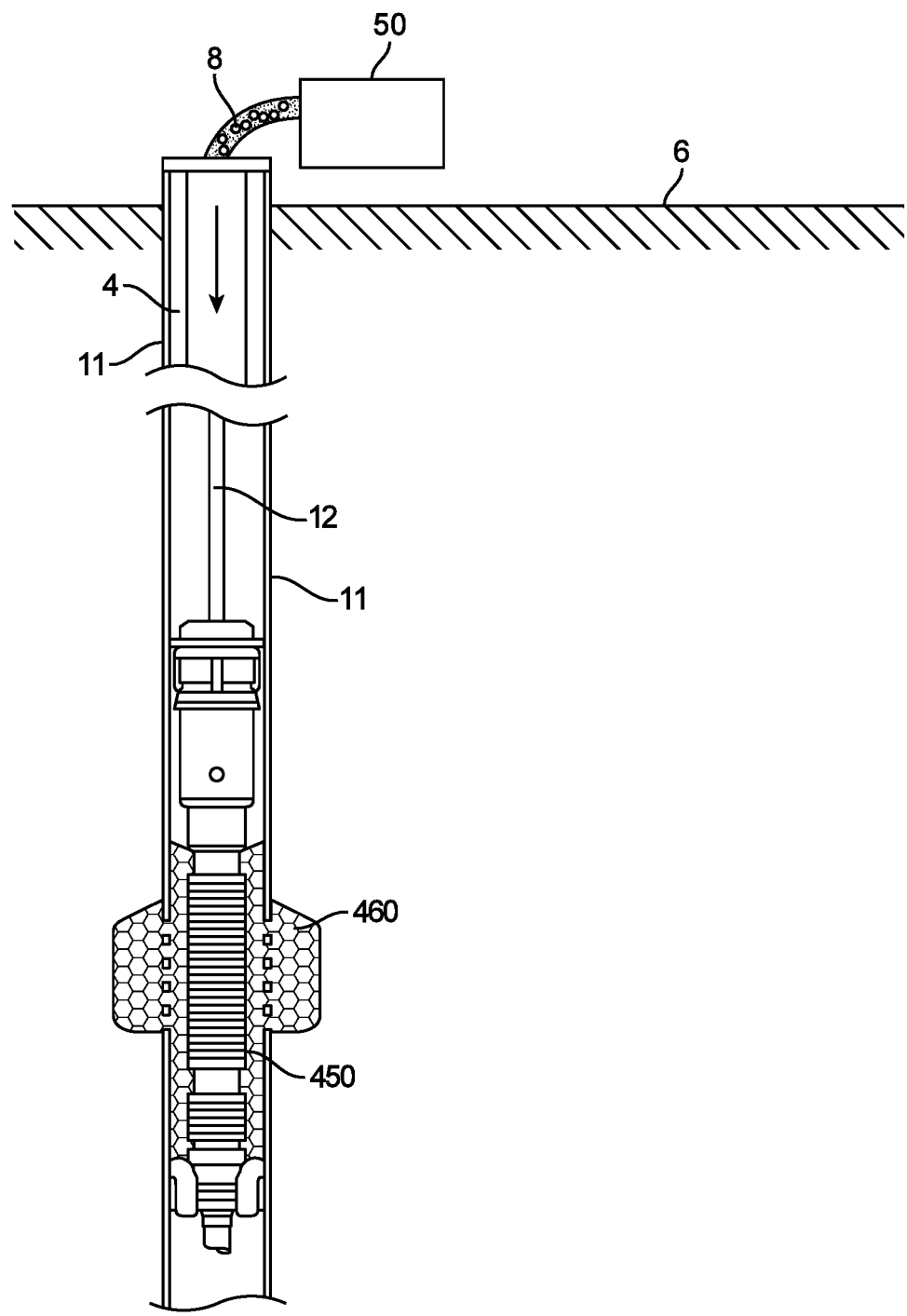
FIG. 3 is a diagram illustrating an example of a subterranean formation in which a gravel packing operation may be performed in association with certain aspects of the present disclosure.

In addition to fracture and diversion operations, the invert emulsion composition disclosed herein may be employed in gravel packing operations as illustrated in FIG. 3. As disclosed therein a screen 450 can be provided within well bore 4. Gravel or sand 460 can packed around the screen 450 to filter the formation sand or unwanted particles. The gravel or sand 460 can be carried downhole via invert emulsion composition from the blender 50.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

Preparation of Comparative Composition 1

Figure 4:
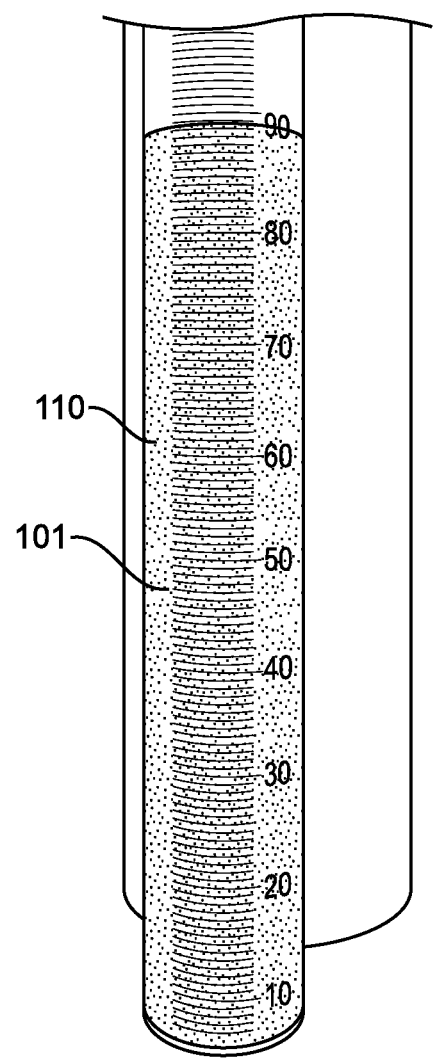
FIG. 4 is an image of a container having a comparative invert emulsion composition which employs mineral oil.

An emulsion was prepared with 88 mL of 35% $CaCl_2$ water, 10 mL of a conventional mineral oil serving as an oleaginous fluid, 2 mL of EZ MUL® NT emulsifier. These components were stirred at 1000 rpm while adding 60 g of CARBOECONOPROP® 30/50 ceramic proppant sold by Carbo Ceramics Inc. to the fluid. After stirring, the composition was observed to be stable after 2 hours at 270° F., as illustrated in FIG. 4. The stable emulsion 101 is shown in container 110.

Figure 5:
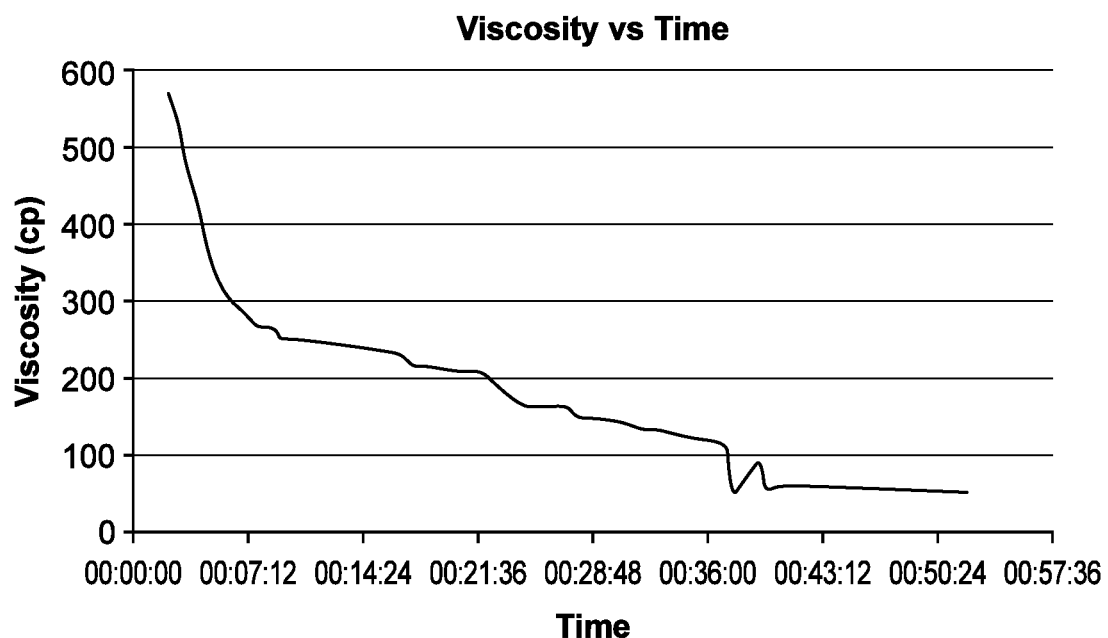
FIG. 5 illustrates a graph of viscosity over time for a comparative invert emulsion composition containing a mineral oil.

The graph of FIG. 5 illustrates the rheology of composition 1, showing Viscosity versus Time. As shown, the viscosity of the composition at 40 s-1 reduced to 50 cp within an hour before reaching stability.

Preparation of Composition 2

Figure 6:
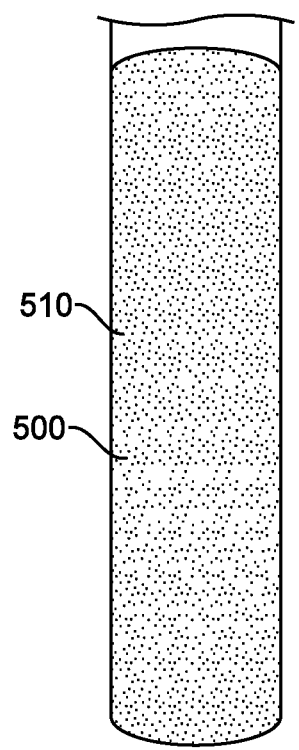
FIG. 6 is an image of an invert oil emulsion composition of the present disclosure containing a vegetable oil.
Figure 7:
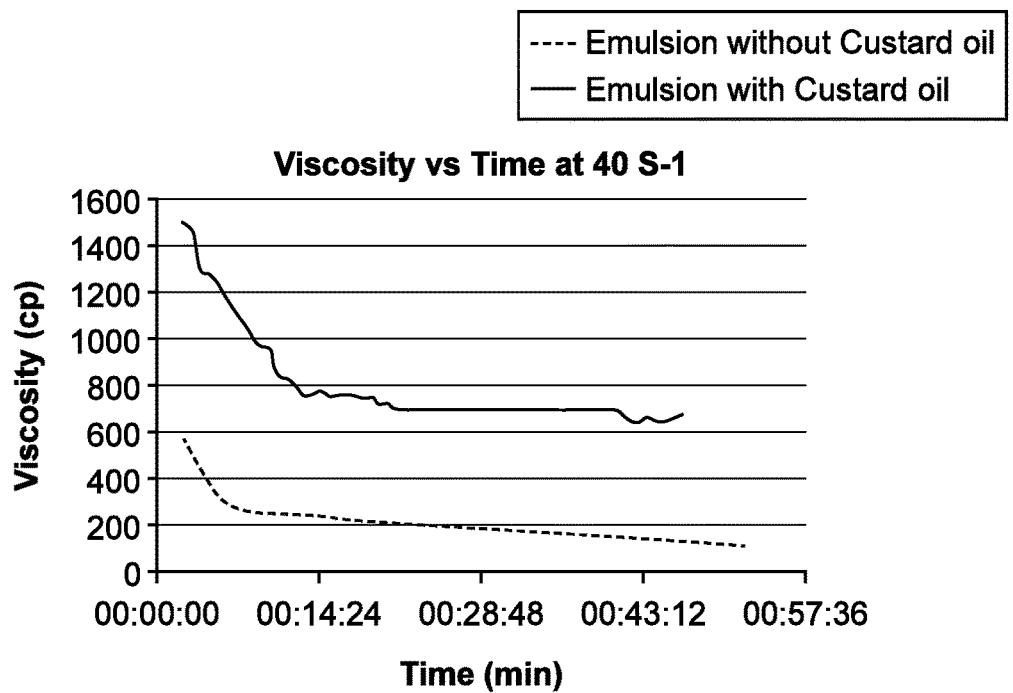
FIG. 7 illustrates a graph of viscosity over time for a comparative invert emulsion composition and an invert oil emulsion composition according to the present disclosure.

Composition 2 is according to the present disclosure and is the same as Composition 1 except that half of the 10 mL of mineral oil of Composition 1 is replaced with custard seed oil (which serves as a vegetable oil herein). Accordingly, composition 2 has oleaginous fluid made up of 5 mL of mineral oil and 5 mL of vegetable oil (1:1 ratio of mineral oil to vegetable oil). As illustrated in FIG. 6, no proppant settling was observed at 280 of even after 3 hours. The stable emulsion 500 is shown in container 510. Furthermore, as shown in the graph of FIG. 7, the viscosity at 40 s-1 is reduced only to approximately 625 cp. Accordingly, the viscosity of the invert emulsion Composition 1 having the custard seed oil is, surprisingly, significantly higher as compared to comparative Composition 1 having a conventional mineral oil. Accordingly Composition 2 with the invert oil having vegetable oil may serve as a better carrier for particulates due to the increased viscosity even in the presence of high temperatures.

Figure 8:
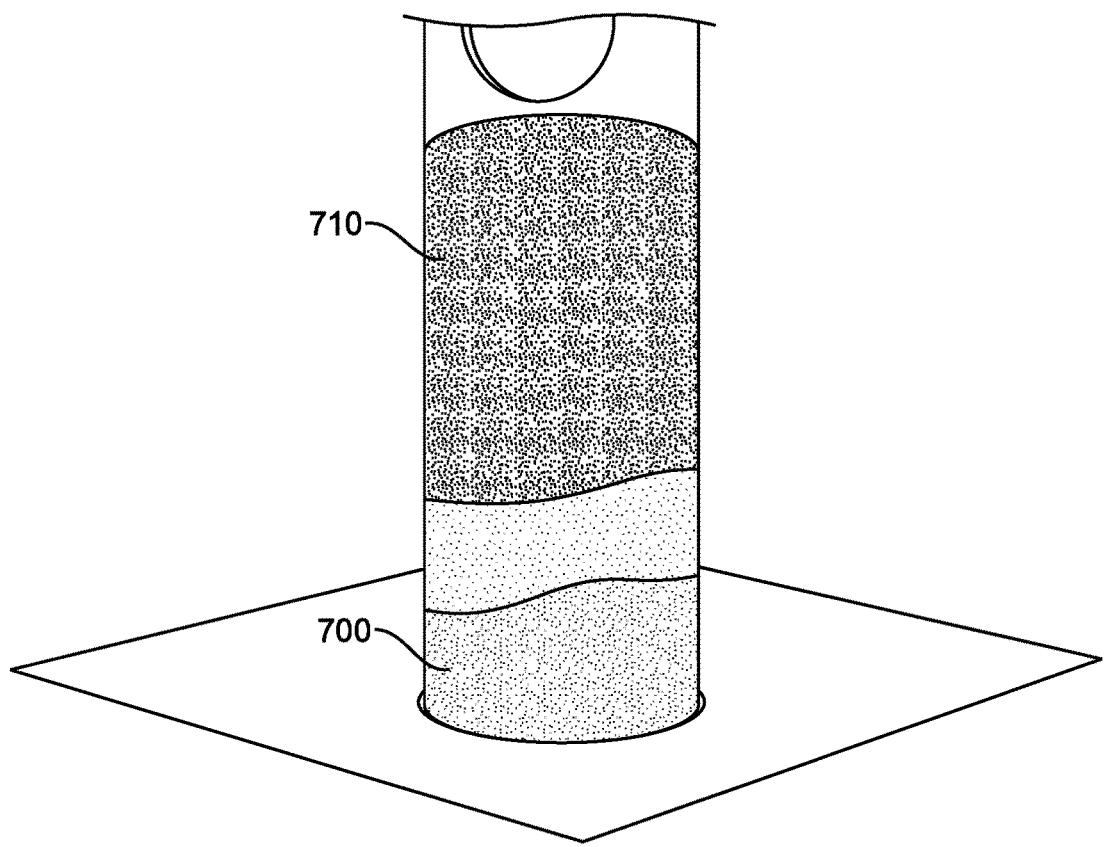
FIG. 8 is an image of an invert oil emulsion composition of the present disclosure which was subject to breaking after encountering crude oil.

Further, as shown in FIG. 8, composition 2 may break in the presence of crude oil. As shown, the proppants 700 have settled at the bottom of container 710. Therefore no additional breaker agents need be added.

Numerous examples are provided herein to enhance understanding of the present disclosure. A specific set of statements are provided as follows.

Statement 1: An invert emulsion composition including a base fluid having an oleaginous phase and a non-oleaginous phase; and an emulsifier, wherein the oleaginous phase comprises a mixture of vegetable oil and an additional oil other than a vegetable oil.

Statement 2: The composition according to Statement 1 further including a proppant.

Statement 3: The composition according to Statement 1 or 2, wherein the proppant is coated with an oil prior to introduction to the invert emulsion composition, the oil forming part of the oleaginous phase after introduction.

Statement 4: A composition according to Statements 1-3, wherein the ratio of oleaginous phase to non-oleaginous phase ranges from about 1:19 to about 19:1 oleaginous phase to non-oleaginous phase.

Statement 5: A composition according to Statements 1-4, wherein the oleaginous phase is present in the composition in a range of 30% or less by volume.

Statement 6: A composition according to Statements 1-5, wherein the oleaginous phase is present in the composition in a range of from about 5% to less than 30% by volume.

Statement 7: A composition according to Statements 1-6, wherein the oleaginous phase is present in the composition in a range of about 10% or less by volume.

Statement 8: A composition according to Statements 1-7, wherein the vegetable oil is present in a range of at least 5% of the oleaginous phase.

Statement 9: A composition according to Statements 1-8, wherein the additional oil other than a vegetable oil is mineral oil.

Statement 10: A composition according to Statements 1-9, wherein the vegetable oil is selected from the group consisting of custard seed oil, almond oil, babassu oil, castor oil, clark A oil, coconut oil, corn oil, cotton seed oil, jojoba oil, linseed oil, mustard seed oil, olive oil, palm oil, peanut oil, safflower oil, sesame oil, soybean oil, sunflower-seed oil, wheat germ oil, and mixtures thereof.

Statement 11: A composition according to Statements 1-10, wherein the vegetable is extracted from plant seed.

Statement 12: A composition according to Statements 1-11, wherein the vegetable oil comprises glyceride.

Statement 13: A composition according to Statements 1-12, wherein the proppant has an average particle size of about 2 mesh or larger.

Statement 14: A composition according to Statements 1-13, further comprising suspension agents.

Statement 15: A method including introducing a invert emulsion composition into a wellbore, the invert emulsion composition including: a base fluid having an oleaginous phase and a non-oleaginous phase; a proppant; an emulsifier; wherein the oleaginous phase comprises vegetable oil and an additional oil other than vegetable oil, and wherein the proppant is coated with an oil prior to introduction to the invert emulsion composition, the oil forming part of the oleaginous phase after introduction.

Statement 16: A method according to Statement 15, wherein the additional oil other than a vegetable oil is mineral oil.

Statement 17: A method according to Statement 15 or 16, wherein the ratio of oleaginous phase to non-oleaginous phase ranges from about 1:19 to about 19:1 oleaginous phase to non-oleaginous phase.

Statement 18: A method according to Statements 15-17, wherein the oleaginous phase is present in the composition in a range of about 10% or less by volume.

Statement 19: A method according to Statements 15-18, wherein the vegetable oil is selected from the group consisting of custard seed oil, almond oil, babassu oil, castor oil, clark A oil, coconut oil, corn oil, cotton seed oil, jojoba oil, linseed oil, mustard seed oil, olive oil, palm oil, peanut oil, safflower oil, sesame oil, soybean oil, sunflower-seed oil and wheat germ oil.

Statement 20: A method according to Statements 15-19, wherein the vegetable oil is present in a range of at least 30% of the oleaginous phase.

Statement 21: A method according to Statements 15-20, wherein the proppant has an average particle size of about 2 mesh or larger.

Statement 22: A method according to Statements 15-21, further comprising mixing the invert emulsion composition using mixing equipment.

Statement 21: A method according to Statements 15-22, wherein the invert emulsion composition is introduced into a subterranean formation using one or more pumps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

The invention claimed is:

1. An invert emulsion composition comprising:
   a base fluid having an oleaginous phase and a non-oleaginous phase, wherein the oleaginous phase comprises a mixture of a vegetable oil and an additional oil other than the vegetable oil;
   an emulsifier; and
   a proppant coated with at least a portion of the mixture of the vegetable oil and the additional oil creating an oil coated proppant, wherein the oil coated proppant is prepared prior to introduction to the base fluid and emulsifier.

2. The invert emulsion composition of claim 1, wherein the vegetable oil or the additional oil of the oil coated proppant forming a portion of the oleaginous phase after introduction.

3. The invert emulsion composition of claim 1, wherein the ratio of oleaginous phase to non-oleaginous phase ranges from about 1:19 to about 19:1 oleaginous phase to non-oleaginous phase.

4. The invert emulsion composition of claim 1, wherein the oleaginous phase is present in the composition in a range of 30% or less by volume.

5. The invert emulsion composition of claim 1, wherein the oleaginous phase is present in the composition in a range of from about 5% to less than 30% by volume.

6. The invert emulsion composition of claim 1, wherein the oleaginous phase is present in the composition in a range of about 10% or less by volume.

7. The invert emulsion composition of claim 1, wherein the vegetable oil is present in a range of at least 5% of the oleaginous phase.

8. The invert emulsion composition of claim 1, wherein the additional oil is a mineral oil.

9. The invert emulsion composition of claim 1, wherein the vegetable oil is selected from the group consisting of custard seed oil, almond oil, babassu oil, castor oil, clark A oil, coconut oil, corn oil, cotton seed oil, jojoba oil, linseed oil, mustard seed oil, olive oil, palm oil, peanut oil, safflower oil, sesame oil, soybean oil, sunflower-seed oil, wheat germ oil, and mixtures thereof.

10. The invert emulsion composition of claim 1, wherein the vegetable oil is extracted from plant seed.

11. The invert emulsion composition of claim 1, wherein the vegetable oil comprises glyceride.

12. The invert emulsion composition of claim 1, wherein the proppant has an average particle size of about 2 mesh or larger.

13. The invert emulsion composition of claim 1, further comprising suspension agents.

14. A method for creating an invert emulsion, the method comprising:
    coating a proppant with a portion of a mixture including a vegetable oil and an additional oil other than a vegetable oil to create an oil coated proppant;

adding an emulsifier to a non-oleaginous phase;
combining the non-oleaginous phase and a oleaginous phase to form a base fluid, the oleaginous phase comprising the vegetable oil and the additional oil; and
adding the oil coated proppant to the base fluid to create the invert emulsion.

15. The method of claim 14, wherein the additional oil is mineral oil.

16. The method of claim 14, wherein the ratio of oleaginous phase to non-oleaginous phase ranges from about 1:19 to about 19:1 oleaginous phase to non-oleaginous phase.

17. The method of claim 14, wherein the oleaginous phase is present in the composition in a range of about 10% or less by volume.

18. The method of claim 14, wherein the vegetable oil is selected from the group consisting of custard seed oil, almond oil, babassu oil, castor oil, clark A oil, coconut oil, corn oil, cotton seed oil, jojoba oil, linseed oil, mustard seed oil, olive oil, palm oil, peanut oil, safflower oil, sesame oil, soybean oil, sunflower-seed oil and wheat germ oil.

19. The method of claim 14, wherein the vegetable oil is present in a range of at least 30% of the oleaginous phase.

20. The method of claim 14, wherein the proppant has an average particle size of about 2 mesh or larger.

21. The method of claim 14, further comprising mixing the invert emulsion composition using mixing equipment.

22. The method of claim 14, wherein the invert emulsion composition is introduced into a wellbore drilled in a subterranean formation using one or more pumps.

* * * * *